C. M. MARSHALL.
TRANSMISSION MECHANISM.
APPLICATION FILED DEC. 20, 1918.
1,351,393. Patented Aug. 31, 1920.
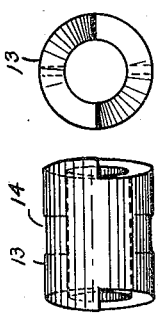
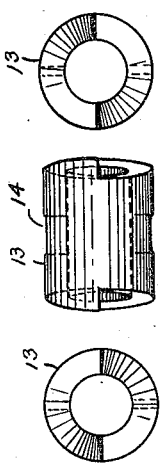
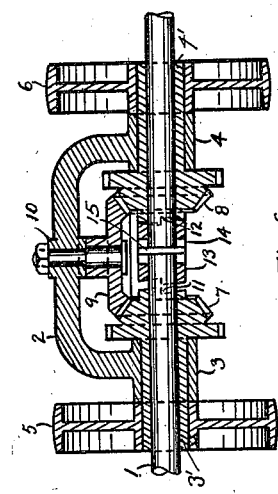
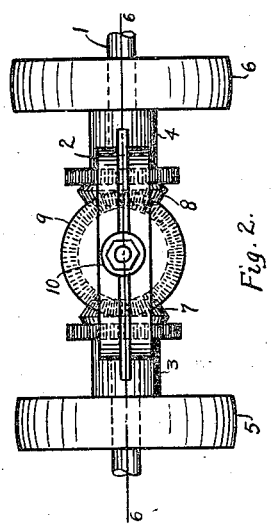
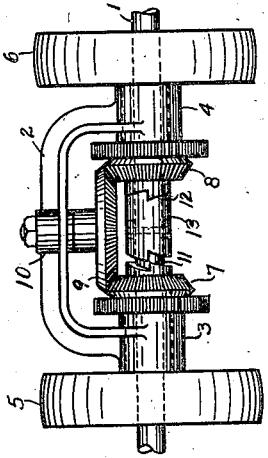
Inventor
Chilton M. Marshall
By Hardway & Cathey
Attorneys

UNITED STATES PATENT OFFICE.

CHILTON M. MARSHALL, OF ELTON, LOUISIANA, ASSIGNOR OF ONE-HALF TO R. E. POWELL, OF JEFFERSON DAVIS PARISH, LOUISIANA.

TRANSMISSION MECHANISM.

1,351,393.  Specification of Letters Patent.  Patented Aug. 31, 1920.

Application filed December 20, 1918. Serial No. 267,735.

*To all whom it may concern:*

Be it known that I, CHILTON M. MARSHALL, a citizen of the United States, residing at Elton, in the parish of Jefferson Davis and State of Louisiana, have invented certain new and useful Improvements in Transmission Mechanism, of which the following is a specification.

This invention relates to new and useful improvements in a transmission mechanism.

The object of the invention is to provide a transmission mechanism which is irreversible, whereby rotation is imparted from the driving to the driven shaft always in the same direction. In some kinds of machinery, it is essential that the driven shaft always rotate in the same direction and it cannot be reversed without injury to the machinery or the liability of an accident. This mechanism has been provided for the purpose of operatively connecting the driving and the driven mechanism, so that the driven will move in the same direction irrespective of the direction of movement of the driving mechanism.

With the above and other objects in view, the invention has particular relation to certain novel features of construction, operation and arrangement of parts, an example of which is given in this specification, and illustrated in the accompanying drawings, wherein:—

Figure 1, is a side elevation of the mechanism.

Fig. 2, is a view taken at right angles to the view shown in Fig. 1.

Fig. 3, is a side elevation of the clutch member, employed.

Fig. 4, is an end view thereof.

Fig. 5, is a view of the opposite end from that shown in Fig. 4, and

Fig. 6, shows a sectional view thereof, taken on the line 6—6 of Fig. 3.

Referring now more particularly to the drawings, wherein like numerals of reference designate similar parts in each of the figures, the numeral 1, refers to the driven shaft, which is supported by the yoke 2, whose arms are formed with bearings 3, and 4, in alinement. Rotatable in said bearings are the sleeves 3′ and 4′ which receive and form bearings for said shaft and which are fixed in their relation to each other by means of said yoke. The outer ends of the sleeves 3′ and 4′, have the respective pulleys 5 and 6, fixed thereon and fixed to the inner ends of said sleeves are the bevel pinions 7 and 8, arranged opposing each other and between these pinions and in mesh therewith is the bevel pinion 9, rotatably mounted in a suitable bearing 10, supported by the transverse portion of the yoke 2. It is obvious that when one of said pinions 7 or 8 is rotated, the other will be rotated, through the pinion 9, in the opposite direction.

The driving member has not been shown, but will normally consist of a shaft in operative connection with one of the pulleys 5 or 6, through a bolt or with one of the pinions 7 or 8, through a spur gear wheel, the rims of said pinions being provided with spur gear teeth for that purpose. The inner ends of each of the sleeves 3 and 4, have two abrupt shoulders, as 11, 11 and 12, 12, oppositely arranged and between said shoulders, said ends are spiraled from the point of one shoulder rearwardly to the base of the other, the shoulders of the respective sleeves locking in opposite directions with respect to the direction of the rotation thereof. Slidably mounted upon the shaft 1, between said sleeves is the clutch member 13, whose respective ends are shouldered in a manner similar to that of the adjacent ends of the sleeves 3 and 4, but in the reverse directions, so as to clutch therewith and this clutch member has an oblong slot 14, through which the pin 15, fixed to the shaft 1, projects, so as to permit said clutch member to slide on the shaft and to prevent it from rotating relative thereto. The clutch member 13, is of a length, including its shoulders, so that when clutched with one of the sleeves 3 or 4, it will clear the shoulders of the other sleeve and thus prevent the locking of the mechanism.

As shown in Fig. 1, the bevel pinion 8, is being driven and the inner end of its sleeve is clutched with the clutch member 13, and rotation will be imparted to the shaft 1, in the same direction that the pinion 8 is rotated. Now should the rotation of said pinion be reversed, the contact of the adjacent sloping faces of the sleeve 4 and member 13, will force said member along the shaft 1, and at the same time, the direction of rotation of the pinion 7, will through the pinion 9, be reversed and the adjacent shoulders of the sleeve 5, and the member 13, will engage continuing the rotation of the shaft 1, in its former direction. It is thus obvious that it is immaterial to which of the pinions 7 or 8, the power is applied, or in which direction they are rotated, as the driven shaft will continue to rotate in the same direction, irrespective of the direction of rotation of the driving member.

What I claim is:

A transmission mechanism, including a yoke, whose arms are formed into extended bearings spaced apart, a sleeve rotatable in each bearing, the inner ends of said sleeves being formed into pinions which are spaced apart, a shaft extending through said sleeves and rotatable independently thereof, an intermediate pinion mounted on said yoke and in mesh with each of the first mentioned pinions, a clutch member slidably mounted upon the shaft between said sleeves, means preventing the relative rotation of said member on said shaft, the inner ends of said sleeves being formed into oppositely facing clutches formed to engage with the corresponding ends of said member alternatively said member being automatically brought into alternative engagement with said sleeve clutches as the direction of the rotation thereof is reversed.

In testimony whereof I have signed my name to this specification in the presence of two subscribing witnesses.

CHILTON M. MARSHALL.

Witnesses:
 ED. RYTHER,
 H. A. TUPPER.